May 5, 1970   E. G. NORDFORS   3,510,814
SOLENOID OPERATOR HAVING ARMATURE PROVIDED WITH GUIDE RINGS
Filed May 31, 1968

INVENTOR:
EDGAR G. NORDFORS
BY
Breitenfeld & Levine
ATTORNEYS

United States Patent Office 3,510,814
Patented May 5, 1970

3,510,814
SOLENOID OPERATOR HAVING ARMATURE
PROVIDED WITH GUIDE RINGS
Edgar G. Nordfors, North Caldwell, N.J., assignor to Automatic Switch Company, a corporation of New York
Filed May 31, 1968, Ser. No. 733,682
Int. Cl. H01f 7/08
U.S. Cl. 335—262                                8 Claims

ABSTRACT OF THE DISCLOSURE

Operator includes guide tube surrounded by a coil, and armature slidable axially within tube. Ring or rings of low-friction material, e.g., Teflon, arranged around exterior of armature, preferably in annular recesses. Rings split so that they may be mounted on armature, and to allow for expansion.

---

This invention relates to solenoid operators of the type in which a movable armature slides within a cylindrical guide tube.

In these operators, the guide tube, which is formed of non-magnetic material, is provided at one end with a plug nut, or stationary armature, of magnetic material. A solenoid coil surrounds the tube, and a yoke of magnetic material around the coil comprises, together with the plug nut and movable armature, a magnetic circuit. When the coil is deenergized, the movable armature is spaced from the plug nut. However, upon energization of the coil by an electric current, the magnetic flux engendered in the magnetic circuit causes the armature to slide axially in the tube until it reaches the plug nut. The armature movement is extremely rapid and the armature strikes the plug nut with considerable force. Upon deenergization of the coil, the armature slides away from the plug nut, in many cases under the influence of a spring.

Operators of this type have many uses, one of which is the actuation of valves for controlling the flow of fluids. The operator may be mounted on a valve body, and the armature arranged to control the flow of fluid through a port formed in the body. The operator is usually arranged on the high pressure side of the port, and the fluid being controlled fills the guide tube and surrounds the armature. If the fluid is a liquid, it serves a lubricating function between the moving armature and the stationary tube and plug nut, thereby minimizing wear between these relatively moving parts.

However, if the fluid being controlled by the valve is a gas, such as air, very little lubricating effect is present. Under these circumstances, rubbing of the moving armature against the inner surface of the tube, and the impact of the armature end face against the plug nut, causes rapid wear of the parts and consequent noisy operation, and eventually failure of the solenoid operator. Wearing of the parts is characterized by peening of the plug nut face by the armature end. This occurs because the armature tilts within the tube, the tilting being permitted by the necessary clearance between the opposed surfaces of the armature and tube. As a result, the end face of the armature and the plug nut face do not meet at the same instant over their entire surface areas. Instead, an edge of the armature strikes the plug nut face, and this line contact mutilates the face. Destruction of the smoothness of the meeting faces of the plug nut and armature is accompanied by deformation of the tube inner surface which is accelerated by metal particles abraded from the rubbing surfaces. As wear progresses, deformation of all meeting surfaces continues increasing the clearance between the armature and tube. This leads to even faster deterioration of the surfaces, often resulting in jamming of the armature within the tube and thus failure of the valve, which may be controlled by the operator, to close. Such a failure is particularly serious when the gas being controlled is a hazardous one, such as a gaseous fuel.

In the past, attempts have been made to combat the problem outlined above. For example it has been suggested that the relatively moving surfaces, or some of them, be plated with certain metals, or coated with dry lubricants. It has also been suggested that the tube be lined with a non-metallic material. However, these expedients have either failed in practice or have proven to be too expensive for use on a commercial scale.

It is therefore an object of the present invention to provide a solenoid operator of the type described wherein the armature remains aligned within the guide tube during its movement, so as to avoid peening of the plug nut face, and wherein metal-to-metal contact between the armature and the tube is eliminated, whereby mutilation of the tube inner surface is prevented.

To accomplish this and other objectives the invention provides one or more rings of low friction material around the armature, the rings being preferably located in peripheral annular recesses formed in the exterior surface of the armature. The rings project radially past the external contours of the armature, and the clearance between the rings and the tube inner surface is only a few thousandths of an inch. The rings are split, i.e., discontinuous to allow them to be placed around the armature, and their ends are spaced apart so that they can expand without significantly reducing the clearance between them and the tube. In addition, the rings are located on the armature so as not to interfere with the magnetic circuit of the operator. An optional longitudinal slot in the armature provides a channel through which fluid between the armature and plug nut may escape as the armature moves toward the plug nut, thus avoiding a dashpot effect, particularly when the operator is being used with a valve handling liquids.

Additional features and advantages of the invention will be apparent from the following description, in which reference is made to the accompanying drawings.

Figure 1:
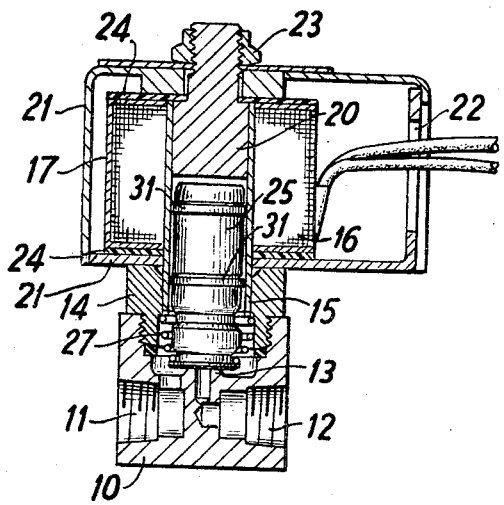
FIG. 1 is a longitudinal cross-sectional view of a solenoid operator according to this invention shown as part of a solenoid operated valve.
Figure 3:
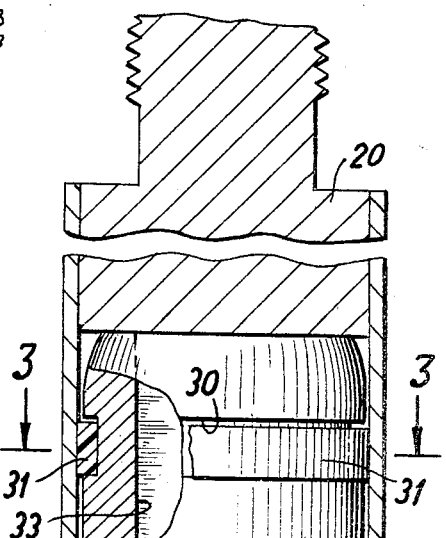
FIG. 3 is a transverse cross-sectional view taken along line 3—3 of FIG. 2.

The present invention is illustrated in terms of a solenoid operator used to actuate a valve. However, it is to be understood that the invention is not limited to this particular environment.

The illustrative valve comprises a valve body 10 having an inlet opening 11, an outlet opening 12, and a valve seat 13 surrounding a port between the inlet and outlet openings. A nut 14 secured to the valve body 10 supports the lower end of a cylindrical guide tube 15, forming part of the solenoid operator for the valve, the guide tube being formed of a non-magnetic material. The operator also includes a solenoid coil 16 surrounding the tube 15, and a generally U-shaped yoke 17 of magnetic material sandwiching the coil 16 between its horizontal arms, these arms also having vertically aligned holes through which the tube 15 passes. A stationary armature, or plug nut, 20 of magnetic material fills the upper end of the tube 15, and a housing 21 shrouds the operator, the housing having an opening 22 through which conductors may pass to connect the coil 16 to a source of power. The plug nut extends upwardly through the housing, and its threaded upper end accommodates a nut 23 for securing the housing of the valve body. Insulators 24 separate the yoke 17 from the housing.

Figure 2:
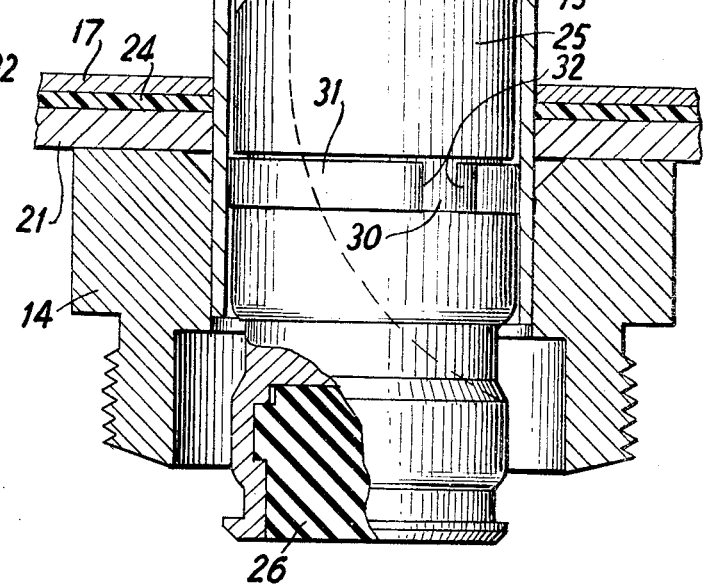
FIG. 2 is a view, on an enlarged scale, of a portion of FIG. 1.
Figure 4:
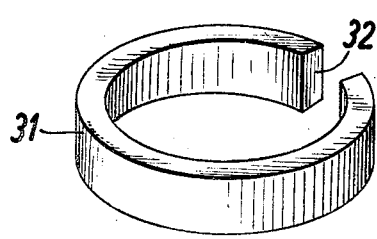
FIG. 4 is a perspective view of a ring useful for carrying out the invention.

Arranged to slide axially within the tube 15 is a generally cylindrical movable armature 25 of magnetic material. In the present example, the armature is hollowed at its lower end to accept a valve member 26 (FIG. 2) of resilient material. The valve member 26 is adapted to cooperate with the valve seat 13. Thus, when the coil 16 is deenergized, as shown in FIG. 1, a compression spring 27 urges the armature downwardly and presses the valve member 26 against the valve seat 13 to close the valve and prevent flow from inlet 11 to outlet 12. In this condition, the upper end face of the armature 25 is spaced from the opposed end face of the plug nut 20.

When the coil 16 is energized, magnetic flux is engendered in the magnetic circuit comprising the plug nut 20, the yoke 17, and the armature 25, whereupon the armature moves upward rapidly, against the force of the spring 27, and the upper end face of the armature 25 slams against the plug nut 20. The armature remains in this condition (FIG. 2), in which the valve is open, as long as the coil 16 remains energized. As may be seen in FIG. 1, when the valve is closed (coil 16 deenergized) the fluid being controlled by the valve, and present at inlet opening 11, fills the entire cavity, defined by the body 10, the nut 14, and tube 15, within which the armature 25 is accommodated. As mentioned above, if this fluid is a liquid, it serves as a lubricant and minimizes the wear between the armature 25, on the one hand, and the tube 15 and plug nut 20, on the other. However, if the fluid is a gas, no such lubricating effect is present.

Consequently, the armature 25 in the present example is formed with two annular grooves or recesses 30, the recesses being in planes perpendicular to the axis of the armature. Within each recess is a ring 31 of low friction material, such as polytetrafluoroethylene (Teflon). The rings project radially outwardly beyond the external surface of the armature 25, and the depth of the recesses 30 and thickness of the rings 31 are so related that only a few thousandths of an inch clearance is present between the outer faces of the rings and the inner surface of the tube 15. Consequently, the rings 31 prevent contact between the armature 25 and the tube 15, and prevent the armature from tilting to any significant extent so that the upper end face of the armature and the opposed face of the plug nut 20 meet across their entire areas simultaneously. Thus, peening of the plug nut face is avoided, and the tube is not subjected to deformation.

Each ring 31 is made discontinuous, i.e., is split, so that it may be applied to the armature 25. Also, a gap exists between the ends 32 of each ring to permit the rings to expand without significantly reducing the clearance between the rings 31 and the tube 15. Consequently, expansion of the rings will not cause the armature to jam in the tube. In addition, the gaps between the ring ends permit a limited degree of venting of the gas caught between the upper end of the armature 25 and the plug nut 20 upon movement of the former toward the latter. Since all the gas cannot escape instantaneously, that portion which remains serves to cushion the armature as it moves toward the plug nut. Under certain conditions, particularly when the operator is being used with a valve for controlling liquids, it is advantageous to provide the armature 25 with a longitudinal slot 33 extending from the upper end face of the armature to a point on the armature below the tube 15. This slot 33 serves as an escape route for liquid located between the armature 25 and plug nut 20 when the armature moves toward the plug nut upon energization of the coil 16. Thus, an undesirable dashpot effect which would otherwise be produced by the liquid trapped between the armature and plug nut is avoided. The slot 33 also reduces eddy currents in the armature, and thereby prevents its overheating.

The locations of the recesses 30 and rings 31 along the length of the armature 25 are carefully chosen so that a ring 31 never enters the plane in which the lower horizontal arm of the yoke 17 meets the tube 15. In this way, the rings do not interfere with the magnetic circuit, and specifically do not disturb the magnetic flux extending through the tube 15 between the yoke 17 and armature 25.

It has been found that an operator having an armature provided with guide rings as described above has a useful life at least ten times that of an otherwise identical operator without guide rings.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A solenoid operator comprising a cylindrical guide tube around which a solenoid coil is arranged, a generally cylindrical armature within said tube and axially slidable therein, and at least two rings of low-friction material arranged around the exterior of said armature, said rings being spaced apart along the length of said armature, and each of said rings projecting radially beyond the external surface of said armature but the external diameter of each ring being smaller than the internal diameter of said tube, whereby said rings may engage the inner surface of said tube to prevent the armature from tilting within said tube during its movement.

2. A solenoid operator as defined in claim 1 wherein each of said rings is arranged in a plane perpendicular to the longitudinal axis of said armature.

3. A solenoid operator as defined in claim 1 wherein each of said rings is discontinuous and its ends are spaced apart, whereby each ring may expand along its length without significantly increasing its external diameter.

4. A solenoid operator as defined in claim 1 wherein said armature is provided with a recess in its external surface for accommodating each ring.

5. A solenoid operator as defined in claim 4 wherein each recess is annular.

6. A solenoid operator as defined in claim 1 wherein said operator is mounted on a valve body having a valve seat, and said armature carries a valve element at one end adapted to cooperate with the valve seat.

7. A solenoid operator as defined in claim 6 wherein a portion of said armature carrying said valve member extends beyond said tube, and including a longitudinal slot in said armature extending from the end of said armature within said tube to a point on the armature beyond said tube.

8. A solenoid operator as defined in claim 1 including a stationary armature within said tube, and means adjacent to the exterior of said tube which together with said armatures comprise a magnetic circuit, said means meeting said tube in a plane spaced axially from said stationary armature, and each ring being so located that it is out of said plane in all positions of said armature.

References Cited

UNITED STATES PATENTS

| | | | |
|---|---|---|---|
| 1,293,052 | 2/1919 | Dinsmoor | 335—262 XR |
| 2,111,232 | 3/1938 | Wetzel | 335—262 XR |
| 2,357,959 | 9/1944 | Kouyoumjian | 335—262 XR |
| 2,651,744 | 9/1953 | Acklin et al. | 335—262 XR |
| 2,692,354 | 10/1954 | Fisher | 335—262 XR |
| 3,010,055 | 11/1961 | Nicolaus | 335—262 |

GEORGE HARRIS, Primary Examiner

U.S. Cl. X.R.

335—279